July 12, 1932. H. J. BENNETT 1,867,246
LOCOMOTIVE DRIVING GEAR
Original Filed April 8, 1930 2 Sheets-Sheet 1
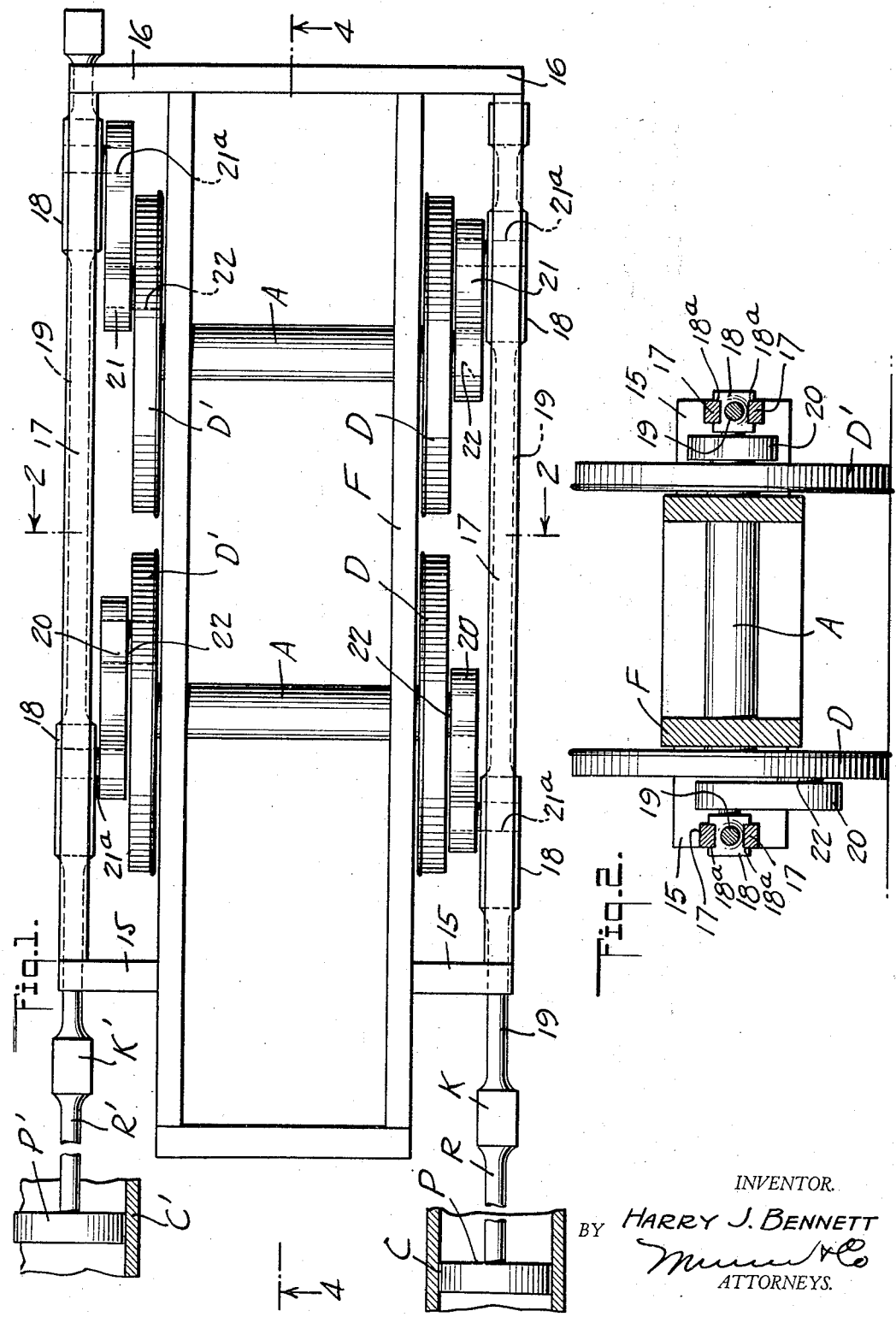
INVENTOR.
Harry J. Bennett
BY
ATTORNEYS.

July 12, 1932.   H. J. BENNETT   1,867,246
LOCOMOTIVE DRIVING GEAR
Original Filed April 8, 1930   2 Sheets-Sheet 2
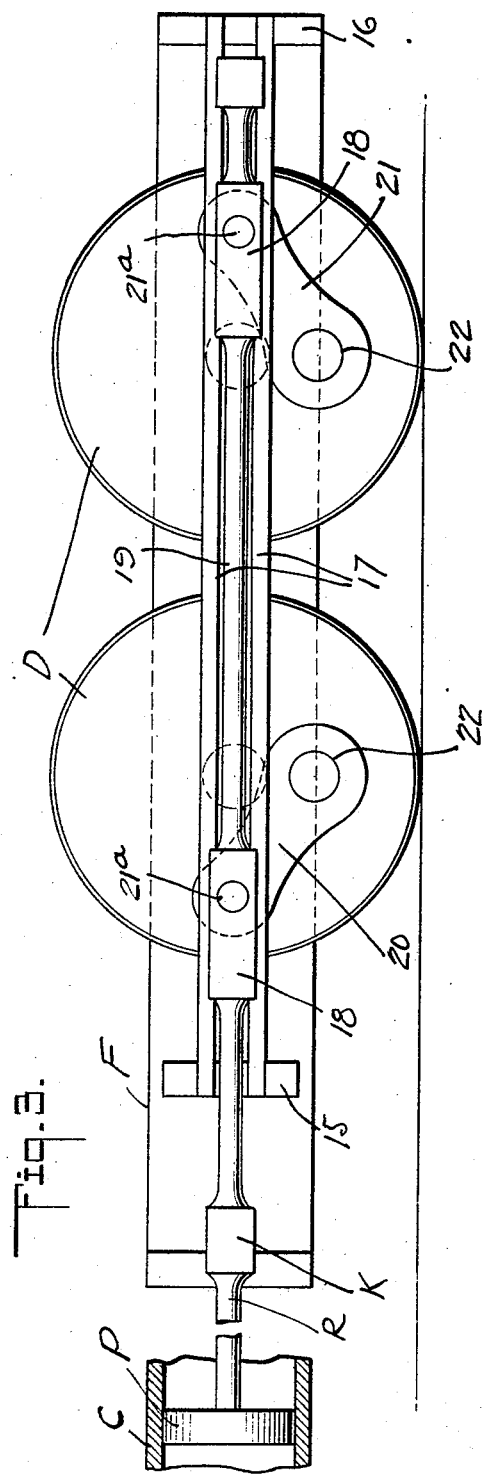
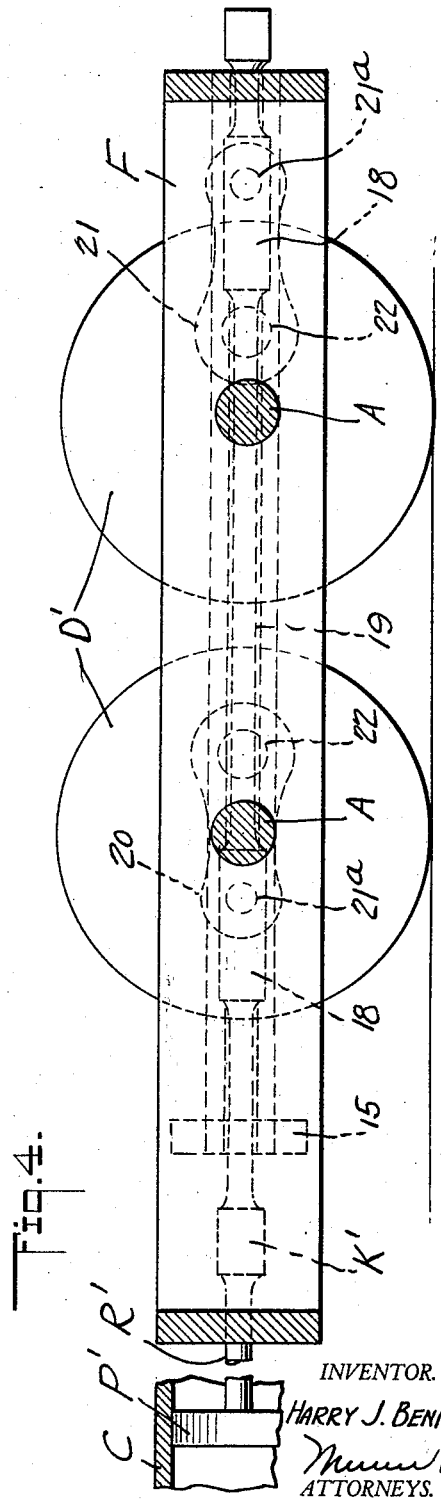
INVENTOR.
Harry J. Bennett
ATTORNEYS.

Patented July 12, 1932

1,867,246

UNITED STATES PATENT OFFICE

HARRY J. BENNETT, OF PHOENIX, ARIZONA

LOCOMOTIVE DRIVING GEAR

Application filed April 8, 1930, Serial No. 442,627. Renewed January 4, 1932.

My invention relates to driving gears for steam locomotives, and it has for a purpose the provision of a driving gear which is structurally and functionally characterized by directly transmitting power from the pistons to the driving wheels of the locomotive to the end of developing maximum power at the driving wheels; imparting push and pull impulses simultaneously to the driving wheels at each side of the locomotive; and displacing the main and connecting rods of the conventional driving gear with elimination of the attendant disadvantages such as the enormous weight of the rods and the side sway of the locomotive, resultant of the vertical motion of these rods and the damage to the roadbed and rails in the event of the rods breaking or becoming disconnected when the driving gear is operating at high speeds.

I will describe only one form of locomotive driving gear embodying my invention, and will then point out the novel features thereof in claims.

In the accompanying drawings:

Fig. 1 is a view showing in top plan the chassis or frame of a locomotive having applied thereto one form of driving gear embodying my invention.

Fig. 2 is a vertical transverse sectional view taken on the line 2—2 of Fig. 1.

Fig. 3 is a view showing the driving gear in side elevation and in association with a locomotive.

Fig. 4 is a vertical longitudinal sectional view taken on the line 4—4 of Fig. 1.

The several views are semi-diagrammatic.

The locomotive here illustrated has a frame F supported for rolling movement by two pairs of driving wheels D and D' disposed at opposite sides of the frame, and mounted on axles A. The usual driving cylinders C and C' are arranged at the forward end of the frame F, and their pistons P and P' have rods R and R' extending rearwardly from the cylinders for connection to the driving gears embodying my invention. These rods R and R' are provided with the usual cross heads K and K' movable in conventional guides (not shown).

The two driving gears embodying my invention, one for each pair of driving wheels D and D' are identical in construction, and hence a description of the construction of one will suffice for both.

As best illustrated in Fig. 1, the opposite ends of the frame F are formed with lateral extensions 15 and 16 to which the opposite ends of a pair of guides 17 are secured in spaced parallel relation to accommodate a pair of cross heads 18 and in such manner that the cross heads are slidable longitudinally between the guides. As shown in Fig. 2, the opposite sides of each cross head 18 are formed with grooves 18ª in which the guide bars 17 are received and so as to confine the cross heads against displacement on the guides. These cross heads are formed integral with the driving rod 19 so that the latter is supported for rectilinear movement between the guides and with its forward end directly connected to the corresponding piston rod R or R' through the medium of the respective cross head K or K'. This connection is such that the driving rod 19 is longitudinally aligned with and rigidly connected to the corresponding piston rod so that reciprocating movement of the latter is directly transmitted to the driving rod. It will of course be understood that a rigid connection is not necessary so long as the connection is such that movement of the piston rod is directly transmitted to the driving rod.

Through the medium of links 20 and 21 the respective cross heads 18 are operatively connected to the corresponding driving wheels D or D', these links being pivotally connected to the cross heads by pins 21ª, and eccentrically connected to the driving wheels by crank pins 22. The crank pins of one pair of wheels D or D' are disposed at the same point about the axis of the wheels as will be clear from a consideration of Fig. 3, but from these crank pins, the links extend in opposite directions in order to transmit push and pull impulses to the driving wheels, as will be more fully described hereinafter. However, the links for the other pair of driving wheels are connected at different points, and preferably at points approximately 90° to the rear in order that one driving gear may operate in advance of the other to eliminate a dead center position.

In the operation of the driving gears, the driving rods 19 are reciprocated under movement of the pistons P, and by reason of their direct connections with the piston rods, power is transmitted directly to the driving rods. Under the guidance of the cross heads 18 and the guides 17, the driving rods are restricted to a rectilinear movement, and through the medium of the links 20, the reciprocating motion of the driving rod is converted into a rotary motion for driving the wheels D and D'. By reason of the opposite positioning of the links for one pair of driving wheels, a pulling impulse is imparted to one wheel and a pushing impulse to the other. The other driving gear operates slightly in advance with respect to the other pair of driving wheels but in the same manner to impart a pulling impulse to one wheel and a pushing impulse to the other.

Although I have herein shown and described only one form of locomotive driving gear embodying my invention, it is to be understood that various changes and modifications may be made therein without departing from the spirit of the invention and the spirit and scope of the appended claims.

I claim as my invention:

1. In a locomotive, a pair of driving wheels arranged one in advance of the other, a driving cylinder in advance of the driving wheels, a driving rod longitudinally aligned and connected to the piston rod of the driving cylinder, a frame in which the driving rod moves in a rectilinear path, and links connected respectively, to the driving rod at the cross heads and to the driving wheels so that under movement of the driving rod in either direction push and pull impulses are transmitted, respectively, to the two driving wheels.

2. In a locomotive, two pairs of driving wheels arranged at opposite sides of the locomotive body, with the wheels of each pair positioned one in advance of the other, a pair of driving cylinders one for each pair of the wheels with each cylinder arranged in advance of the respective driving wheels, a pair of driving rods one for each pair of wheels longitudinally aligned and connected to the piston rod of the respective driving cylinder, a pair of frames in which the respective driving rods move in rectilinear paths, and two pairs of links one for each pair of driving wheels connected to the respective driving rod at the cross heads and to the driving wheels so that under movement of the driving rods in either direction push and pull impulses are transmitted, respectively, to the two driving wheels of each pair, the links for one pair of wheels being connected to the respective wheels in advance circumferentially of the connection of the other pair of links to the other pair of wheels.

HARRY J. BENNETT.